United States Patent [19]
DeFillipi et al.

[11] Patent Number: 5,979,794
[45] Date of Patent: Nov. 9, 1999

[54] TWO-PART STREAM DISPENSING FOR HIGH VISCOSITY MATERIALS

[75] Inventors: Michael E. DeFillipi, Grosse Pointe Park; Gregory D. Kremer, Livonia; Michael R. Becker, Sterling Heights, all of Mich.

[73] Assignee: Ingersoll-Rand Company, Woodcliff Lake, N.J.

[21] Appl. No.: 08/854,940

[22] Filed: May 13, 1997

[51] Int. Cl.$^6$ ........................................................ B05B 1/24
[52] U.S. Cl. ............................ 239/135; 239/62; 239/432; 239/600; 222/145.6; 222/146.5; 901/43
[58] Field of Search .................................. 239/61, 62, 133, 239/134, 135, 138, 139, 390, 432, 600; 222/137, 145.6, 146.2, 146.4, 146.5; 901/43

[56] References Cited

U.S. PATENT DOCUMENTS

| | | | |
|---|---|---|---|
| 4,592,495 | 6/1986 | Toda et al. | 222/146.5 X |
| 4,678,100 | 7/1987 | Gelinas et al. | |
| 4,809,885 | 3/1989 | Hayashi et al. | 901/43 X |
| 4,922,852 | 5/1990 | Price . | |
| 5,026,187 | 6/1991 | Belanger et al. | 222/146.5 X |
| 5,069,881 | 12/1991 | Clarkin | 239/432 X |
| 5,372,283 | 12/1994 | Schmitkons et al. | 222/145.6 |
| 5,499,745 | 3/1996 | Derian et al. | 222/145.6 X |
| 5,542,578 | 8/1996 | Buckles . | |
| 5,747,102 | 5/1998 | Smith et al. | 222/146.5 X |

FOREIGN PATENT DOCUMENTS

| | | |
|---|---|---|
| 0443 262 | 8/1991 | European Pat. Off. . |
| 0599 104 | 6/1994 | European Pat. Off. . |
| 42 09 065 | 9/1993 | Germany . |

OTHER PUBLICATIONS

Hitchen C., "Robotic Adhesive Dispensing System", Research Disclosure, vol. 280, No. 056, Aug. 1987, p. 510 XP002078121.
Andrea Baker, Get More Grip With Structural Adhesives, Design News, Feb. 7, 1994.
ConProTech, STATOMIX, Brochure, Sep. 1993.

*Primary Examiner*—Andres Kashnikow
*Assistant Examiner*—Steven J. Ganey
*Attorney, Agent, or Firm*—Young & Basile, P.C.

[57] ABSTRACT

A robot arm mounted apparatus for high speed streaming of high viscosity, two-part adhesive onto a workpiece. The apparatus employs a shortened, temperatured-conditioned mixing tube and a compact, end effector package of dispense metering equipment associated directly with the mixing tube on the end of the robot arm, rather than mounted remotely as in prior art systems. In a preferred form a pressurized cylinder, displacement rods and chambers, dispense metering valves and shortened, temperature-conditioned mixing tube are connected to one another directly in serial fashion on the end of the robot arm. The mixing tube is preferably modified with a removable, damage-resistant nozzle designed especially for streaming.

42 Claims, 5 Drawing Sheets

TWO-PART STREAM DISPENSING FOR HIGH VISCOSITY MATERIALS

FIELD OF THE INVENTION

This invention relates to systems for dispensing high viscosity, semi-fluid sealants and adhesives from a nozzle, especially where the nozzle moves rapidly across a workpiece. More particularly, the invention relates to such dispensing using two part viscous materials which must be mixed as they are applied to a work surface.

BACKGROUND OF THE INVENTION

It is now common in the automotive and other industries to fasten large parts to one another with structural adhesives which act as both weld and sealant, for example to join body panels. This is often done on an assembly line via automated, robot-mounted dispenser nozzles moving at fairly high speed over the workpiece.

Adhesives applied in this manner are typically of high viscosity and are often semi-rigid at room temperature, and must be applied at both high temperature and high pressure to flow properly from the nozzle onto the workpiece.

There are two primary methods for applying high viscosity adhesives, sealants, epoxies and the like (hereinafter "adhesives") from a moving dispenser nozzle: "extrusion" and "streaming". "Extrusion" is illustrated in FIGS. 1 and 2, and occurs where tool speed exceeds the velocity of adhesive flow from the nozzle at a relatively low order of magnitude, for example 2:1. The nozzle must be kept close to the work surface, for example on the order of 3 mm (roughly ⅛") where it forms an initial bead size which settles or flattens out in the wake of the dispenser nozzle to a desired bead size, for example 2 mm. The nozzle diameter typically approximates the desired bead size.

"Streaming" is a higher speed application with the nozzle spaced much farther from the workpiece, for example on the order of 50 mm (2 inches) rather than 3 mm (⅛ inches). In order to stream the high viscosity adhesive, it is necessary to increase its temperature, increase pressure, and reduce nozzle diameter to as low as 1/16 or 1/20 the diameter of the desired bead size so that it flows or "streams" freely like a liquid.

A factor to be considered in the automated application of such adhesives is whether the adhesive is a one-part or two-part material. One-part adhesives are simpler to apply, and lend themselves to high speed streaming applications. Two-part adhesives are known to form a stronger bond, but require mixing of the component parts just prior to being applied to the work surface. Mixing is typically accomplished through a relatively long mixing tube which receives the pressurized, temperature-conditioned components of the adhesive separately at its upper end and, via a helical arrangement of internal mixing plates, mixes the components by the time they reach the nozzle or outlet end of the tube. Mixing requires a relatively long tube which takes up valuable space at the end of the tool or robot arm; requires more complicated pressure regulating equipment, valving, and preheating equipment, which is too bulky to fit on the end of the robot arm with the mixing tube and must be located remotely; and tends to cause the two-part mixture to set inside the tube before it is dispensed. Since most automated assembly line dispensing applications require high speed and close control over adhesive pressure, temperature and volume, the poor quality of tube mixing has resulted in two part adhesives being largely ignored for streaming-type applications and confined to lower velocity "extrusion" applications.

State of the art mixing tubes are long, slender (usually plastic) tubes which are relatively inexpensive to replace when clogged, and which are useful for precise application of adhesive in confined areas. However, these same advantages make them relatively weak and prone to bending or damage, which at a minimum throws off the precision of the applied adhesive pattern.

A related problem with automated adhesive dispensing, especially at high speed, is the need to maintain constant bead uniformity and volume over the workpiece. For example, a perimeter bead of adhesive applied to an automobile door panel needs to be applied in just a few seconds on a high speed assembly line. As the adhesive bead is applied around the perimeter of the door panel, it undergoes several direction and velocity changes, decelerating into turns and accelerating out of turns. Again, the critical nature of volume control under these conditions has limited use to streaming-friendly one part adhesives.

SUMMARY OF THE INVENTION

It is an object of the present invention to adapt two part, tube-mixed adhesives to high speed streaming applications.

It is a further object of the invention to obtain improved volume control over the adhesive bead in high speed streaming applications involving rapidly accelerating/decelerating direction changes sufficiently to allow the use of two part adhesives.

The first object is achieved with a temperature-conditioned mixing tube, and further with a tool-mounted pressure regulator package immediately adjacent the temperature-conditioned tube on the end of the dispenser arm. The temperature conditioning of the mixing tube allows it to be significantly shortened, and narrowed, increasing point of application control over the flow of adhesive. Temperature conditioning is preferably provided by a heated jacket which also reinforces the slender tube. In a preferred form a disposable, damage-resistant streaming orifice is fastened to the end of the mixing tube to produce a high velocity stream of mixed material in a single straight trajectory from a distance of 1 to 3" away from the workpiece.

The second object is achieved in part by the tool-mounted displacement metering package, which provides immediate and precise pressure/volume control to the sealant being dispensed from the nozzle, and further by a variable pressure command to the tool-mounted displacement metering package.

These and other aspects of the invention are explained in further detail below in relation to the drawings of an exemplary embodiment of the invention.

DETAILED DESCRIPTION OF THE ILLUSTRATED EMBODIMENT

As used herein "adhesive" will generally refer to two-part materials such as, but not limited to, structural adhesives, sealants, epoxies, polyurethanes, and hybrid formulations which are gradually replacing the use of welds and mechanical fasteners in automated assembly of automobiles and other equipment.

As used herein, the term "robot arm" will generally encompass any applicator machine or assembly which can be moved rapidly over a workpiece to stream adhesive onto its surface in a controlled manner.

Figure 1:
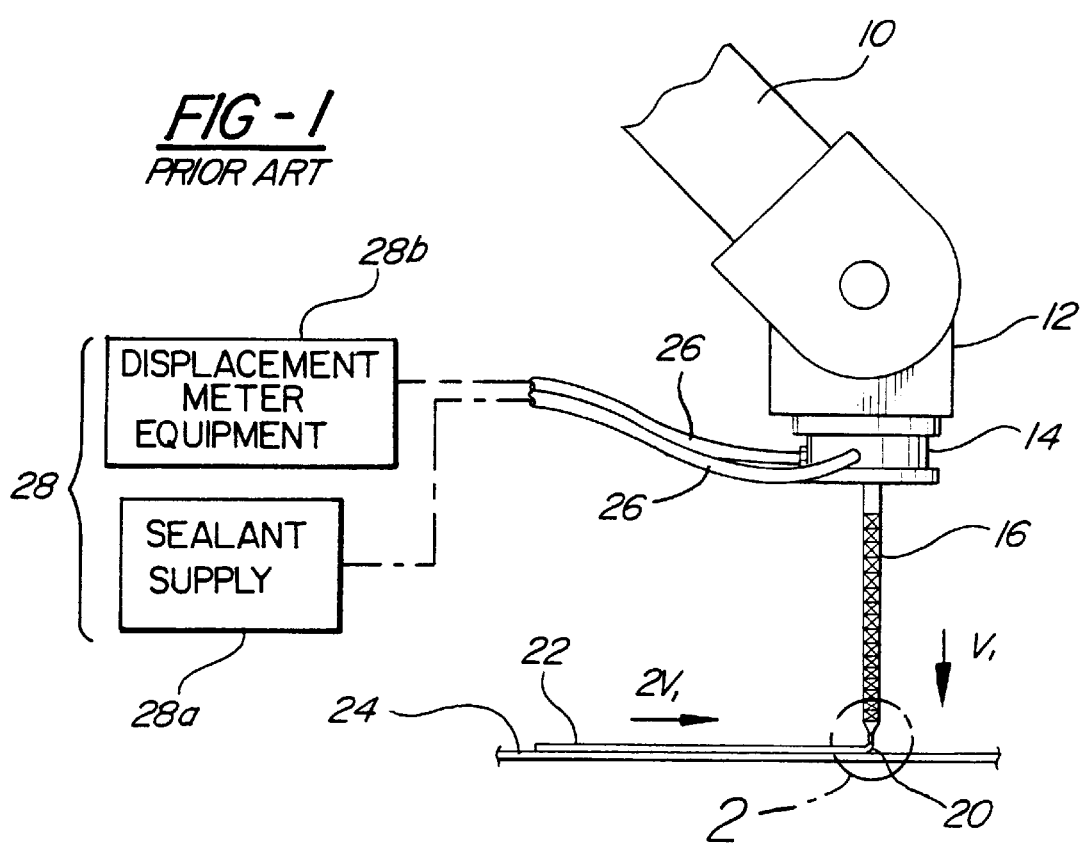
FIG. 1 is a schematic representation of a prior art system for applying a two-part adhesive through a mixing tube at extrusion speeds.
Figure 2:
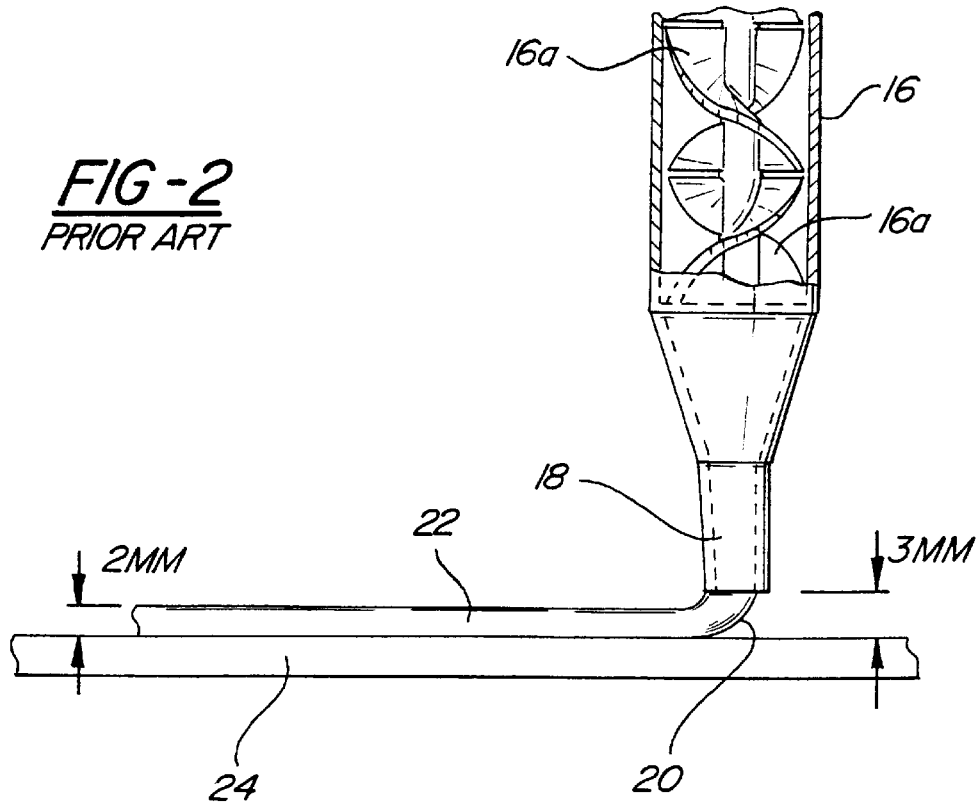
FIG. 2 is a detailed view of the dispenser end of the mixing tube shown in FIG. 1, and the extrusion bead which is formed as it passes over a workpiece.

Referring first to FIGS. 1 and 2, a typical prior art adhesive dispensing assembly is shown schematically as it applies a two-part adhesive to a workpiece by "extrusion", since it does not lend itself to applying two-part adhesives by "streaming".

FIG. 1 illustrates the end of a robot dispenser arm 10 which supports the "end effector" 12, a general term in the industry for any tool package which the robot arm applies to a workpiece. In the illustrated adhesive-applying embodiment of FIG. 1, the end effector package is a standard twenty-four plate mixing tube 16 depending from a simple valve housing 14 supplied with pre-pressurized, pre-heated adhesive components from a remote sealant supply 28a and displacement metering package 28b of known type. Mixing tube 16 is typically made from plastic, sometimes from metal and is commercially available, for example under the trademark Statomix®.

Typically, hoses 26 will separately supply both parts of the two-part material in a pre-pressurized, pre-heated form. The valving in valve housing 14 may also be controlled automatically by fluid pressure supplied from displacement metering 28 via additional hoses or pressure lines (not shown). The two separately supplied parts of the adhesive are supplied in pre-determined ratios by the valving in housing 14 to the upper end of mixing tube 16, whose internal mixing plates 16a mix the pressurized, heated components as they flow toward nozzle end 18 of the tube. By the time the two components reach nozzle 18, they are fully mixed and ready to apply to the surface of workpiece 24.

The tube-mixed adhesive is initially applied to the workpiece as a bead 20 having an initial bead size or height (for example approximately 3 mm) higher than the desired bead size or height 22 (for example approximately 2 mm) which occurs as the adhesive is drawn and flattened out in the wake of the nozzle. This is typical in the extrusion process, where the lateral velocity of the robot arm and nozzle 18 over the workpiece ($2V_1$) is a relatively low order of magnitude faster than the flow rate of adhesive from the mixing tube ($V_1$).

FIGS. 1 and 2 illustrate the extrusion process commonly used with the mixing tubes for two-part adhesive. As explained above, the remote displacement metering package and long mixing tube required for the robotic dispensing of two-part materials does not provide sufficient control over pressure, temperature and volume to commend itself to higher speed streaming applications. For example, the heat and pressure at which the components of the two-part adhesive are initially supplied from displacement metering 28 tend to drop by the time they pass through hoses 26, valving 14, and the long, unheated mixing tube 16. The long mixing tube, needed to fully mix the components received from the displacement metering, tends to promote the setting of the two-part material within the tube, requiring frequent cleaning, purging, or replacement. Also, with high speed streaming operations in which the robot arm is making sharp turns, the volume of material dispensed onto the workpiece 24 requires rapid adjustment; the response time of the remote displacement metering package 28 and long mixing tube 16 of the system illustrated in FIG. 1 is elastic enough that it cannot maintain adequate point-of-application control over adhesive temperature and pressure.

Accordingly, the use of two-part adhesive has been primarily limited to slow speed extrusion operations, while streaming applications have used simpler, mix-free, one-part adhesives. However, since two-part adhesives offer several advantages, including greater strength and faster set time, the present invention has been designed to allow the use of two-part adhesive in streaming applications.

Figure 3:
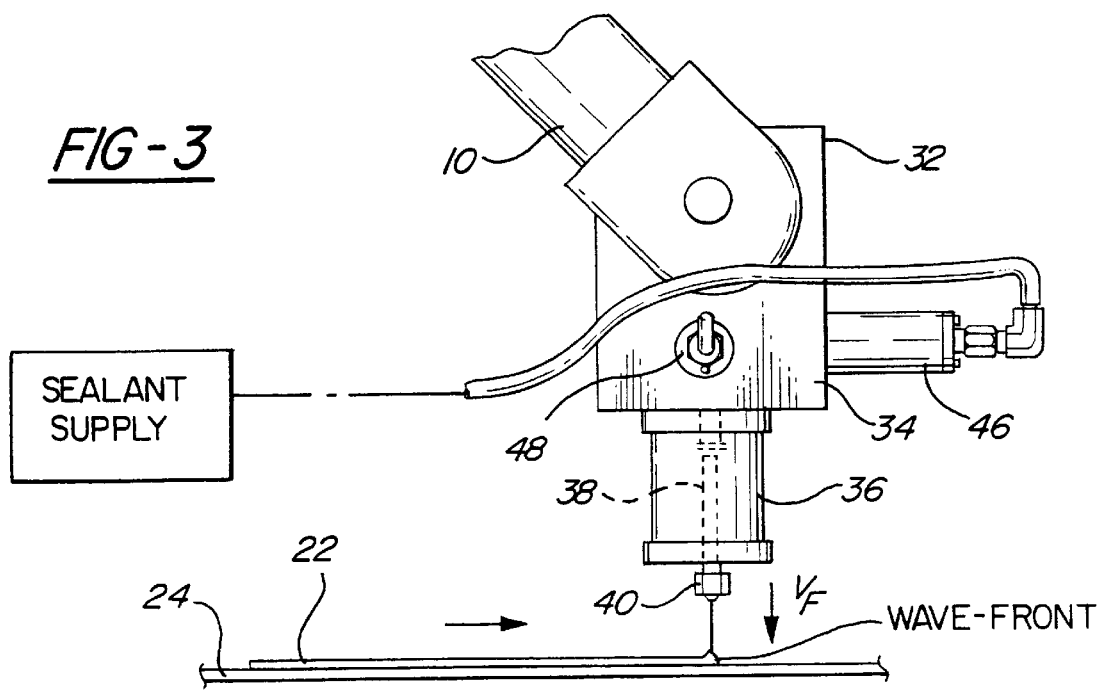
FIG. 3 is a side view of a tool mounted displacement metering package and shortened, thermally conditioned mixing tube according to the present invention, moving relative to a workpiece at streaming speeds.
Figure 4:
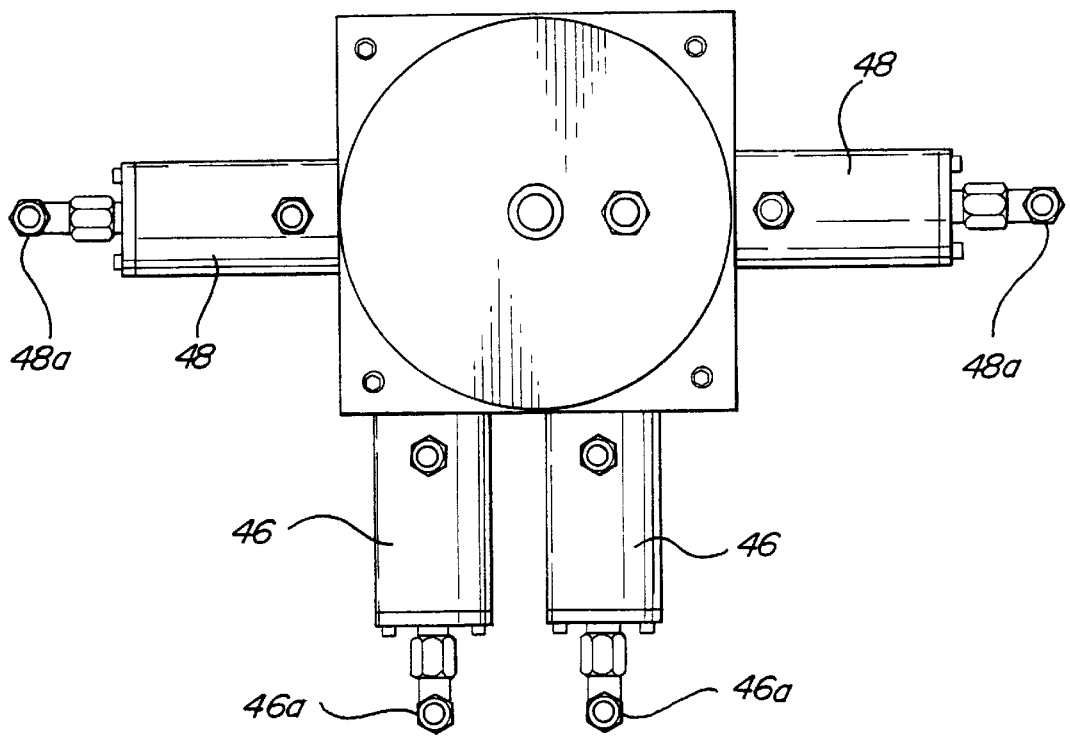
FIG. 4 is a plan view of the displacement metering package of FIG. 3.

FIG. 3 illustrates an improved, robot arm-mounted two-part dispensing assembly according to the present invention. The long mixing tube 16 of FIG. 1 has been replaced with a temperature-conditioned, shortened mixing tube 38 located inside a metal temperature-conditioning jacket or housing 36. Mixing tube 38 is structurally similar to mixing tube 16 in FIG. 1, except that it is shorter, and narrower, for example containing only eight to sixteen helical mixing plates 16a, rather than twenty-four plates as illustrated in FIG. 1. It is preferably also narrower, with as little as one-seventh ($\frac{1}{7}$) the internal volume of tube 16. By way of example, where a prior art extrusion mixing tube (MS08-24) had a diameter of 0.375", a length of 9", and included 24 mixing plate stages at a ratio of 2.5 plates per inch, streaming can be accomplished with the present invention using a mixing tube (MS06-16) with a diameter of 0.250", a length of 4.75", and sixteen mixing plate stages at a ratio of 4 plates per inch. The temperature-conditioning jacket maintains immediate temperature control over the entire length of the tube, resulting in the components of the two-part adhesive being mixed over a much shorter length of tube.

The shortened length of the temperature-conditioned mixing tube also allows for the inventive arrangement of the displacement metering package 28 (pressure piston, plunger rods, refill valving) directly on the robot arm, immediately upstream of the mixing tube and dispense valving. Piston block portion 32, metering block portion 34, and refill and dispense valves 46 and 48 are all located on the end of robot arm 10 in close association with the mixing tube.

Still referring to FIG. 3, the inventive mixing tube and displacement meter package assembly can be used for high speed streaming applications in which the streaming orifice 42 of the mixing tube is located much farther from the workpiece 24 (for example, on the order of 2–3 inches rather than ⅛ inch) while the overall length of the end effector package is decreased. The lateral velocity of the robot arm and end effector over the workpiece is two to four times higher, for example 500–1000 mm/sec streaming versus 200 mm/sec for extrusion, with a correspondingly higher rate of flow. There are several advantages to this arrangement. In addition to high speed operation, the greater distance between the adhesive-applying nozzle and the workpiece eliminates interference previously caused in extrusion operations by dimensional irregularities in the workpieces, or accidents from misloaded workpieces. For example, sheet metal auto body panels tend to warp sufficiently to disrupt the ⅛ inch nozzle/workpiece spacing in extrusion dispensing. Panels cut from the inner end of a sheet metal roll tend to warp more than those cut from the less tightly wound outer end.

Another difference between the streaming operation in FIG. 3 and the extrusion operation of FIG. 1 is that streaming uses a nozzle diameter much smaller than the desired bead size, for example an orifice diameter approximately one-fourth the diameter (or ¹⁄₁₅ the cross-sectional area) of the desired bead size; in extrusion, the nozzle diameter approximates bead size. Because the streaming orifice commonly has a material passage that is only ¹⁄₁₅ the size of an extrusion nozzle, and because the robotic application speed for a streaming is 2.5 to 5 times faster than for extrusion, then the velocity of the material issuing from the streaming orifice will be 37 to 75 times faster than the material velocity through an extrusion nozzle applying an equivalent bead size.

The higher rate of flow in streaming requires high temperature and high pressure for the adhesive materials. It has been found by the inventors that the typical adhesives are fairly stiff at room temperature, and will not stream at room temperature, but ineffectively "wiggle" out of the nozzle in a semi-fluid state. We have also found that the materials' resistance to flow (viscosity) is reduced by approximately half for every 10° F. increase in temperature. The adhesives usually need to be heated above 90–100° F. until they start to behave like a true liquid and "stream". Adhesives formulated to be stiff and wash-resistant adhesives may need to be heated to as high as 160–170° F. for streaming.

Figure 7:
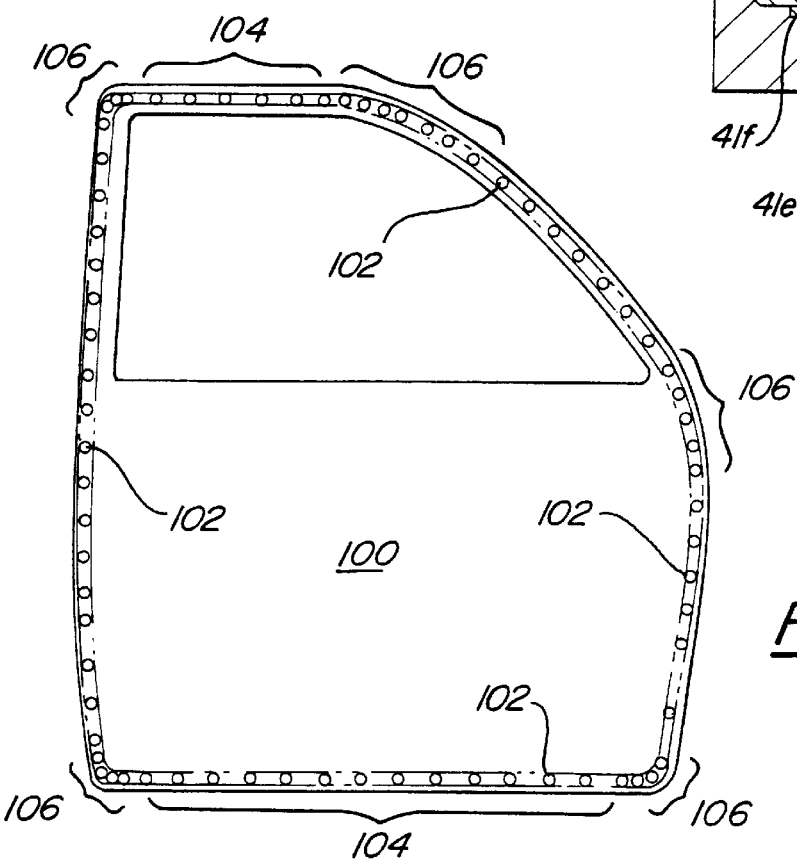
FIG. 7 is a schematic representation of bead velocity and volume as a perimeter bead of adhesive is applied to an automobile door panel.
Figure 8:
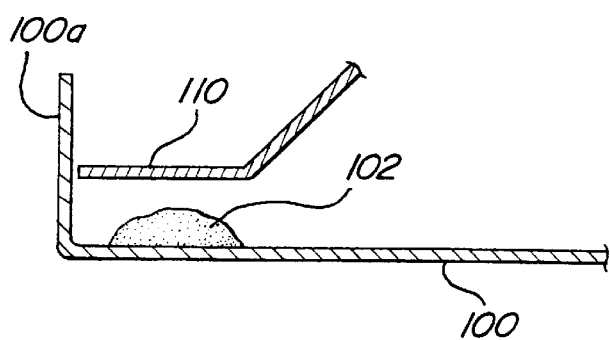
FIG. 8 is an edge section view of a door panel and adhesive bead and a second panel being applied thereto in a standard hem flange.
Figure 9:
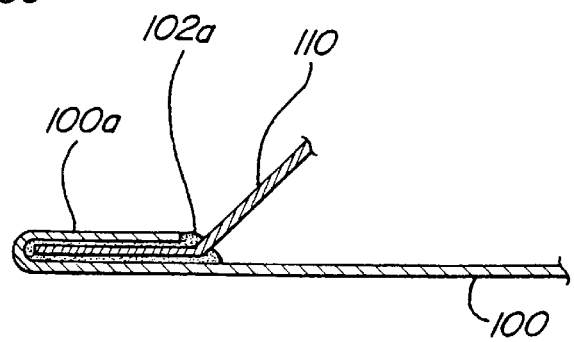
FIG. 9 shows the finished flange of FIG. 8, where excess bead volume has resulted in sealant being forced out of the flange.

The adhesive temperature and pressure directly affect flow volume. Referring to FIG. 7, a typical adhesive-streaming application is illustrated to show the criticality of volume, pressure and temperature control at the point of dispensing. FIG. 7 illustrates an automobile door panel 100 onto whose perimeter a continuous bead 102 of two-part adhesive is streamed to bond a mating panel as shown in FIGS. 8 and 9. Second panel 110 is often secured to the first panel 100 in a common "hem flange" in which the edge of panel 110 is first forced down on top of sealant bead 102, and then run through a hemming die of known type. The die crimps the upstanding hem 100*a* of panel 100 over the edge of panel 110 and squeezes them tightly together to flatten the adhesive under the edge of panel 110 as shown in FIG. 9 so that a solid joint or seam is formed when the adhesive sets.

It is critical to keep the adhesive bead constant around the perimeter of the workpiece for a uniform hem flange or other sealing fit. A uniform adhesive bead, however, requires uniform flow volume over the entire workpiece as the adhesive is streamed from the dispenser apparatus. If too little adhesive is applied at any point, the joint or seam may be inadequate, causing vibration and/or rust. If too much adhesive is applied (the more common problem), extra adhesive 102*a* is squeezed up and around panel 110 of the hem flange or joint and causes several problems. Excess adhesive can ruin hemming dies by abrasive action. Excess adhesive also interferes with washing and painting operations farther down the assembly line, and can effectively ruin an entire paint job on a vehicle when, after a special solvent washing, minute particles of adhesive are deposited over the surface about to be painted.

Referring back to FIG. 7, the schematically illustrated adhesive bead 102 shows how the problem of excess bead volume occurs in high speed streaming operations. In the straightaway regions 104 the adhesive dispenser is moving at a fairly constant velocity, and therefore applying a constant volume bead of adhesive. However, when the dispenser nozzle decelerates into corners 106, and then accelerates out of them, failure to correspondingly reduce and then increase the flow volume of adhesive in those regions results in a sudden build-up of excess adhesive, creating the problems described above. It is accordingly critical to maintain precise temperature and pressure, and hence volume, control over the streamed, two-part adhesive. The inventive apparatus illustrated in FIGS. 3–6 provides such control.

Figure 6A:
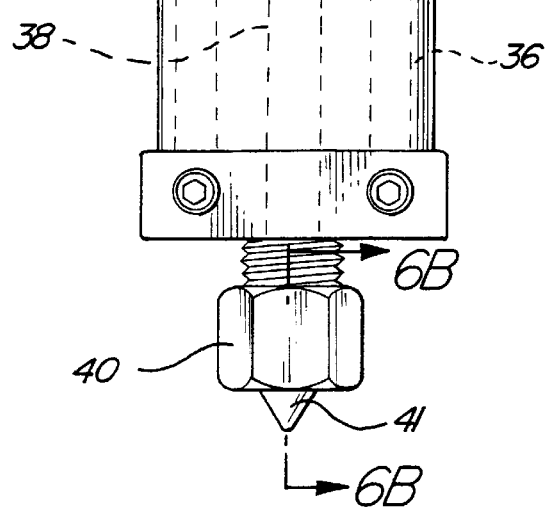
FIG. 6A is a detailed view of the valve seat structure of FIG. 6.
Figure 6A:
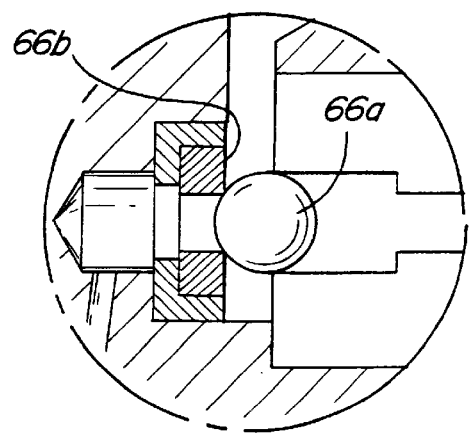
Figure 6:
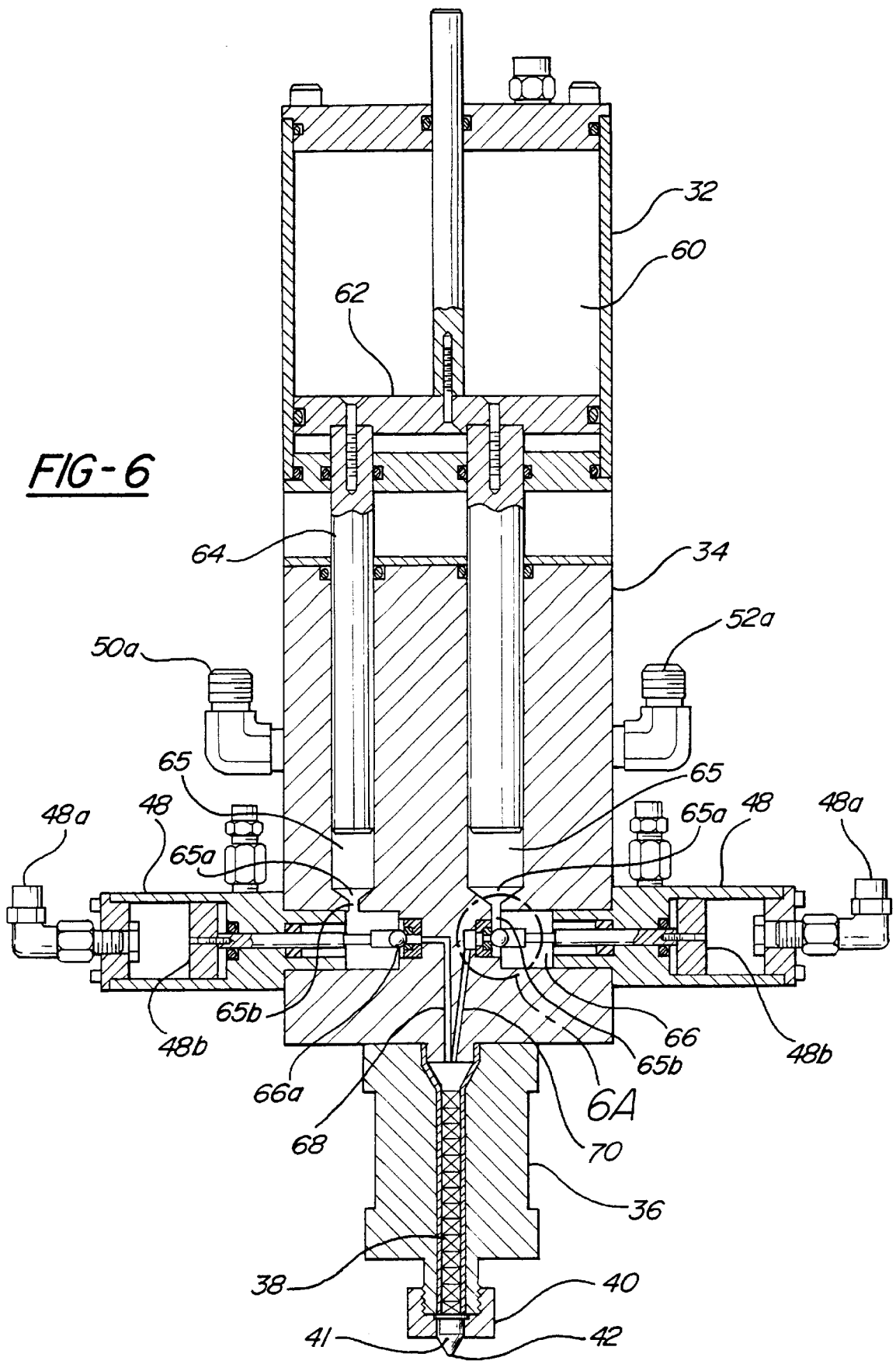
FIG. 6 is a front section view of the entire pressure package and mixing tube combination of FIG. 3.

Reference will primarily be made here to FIG. 6, which is the most detailed of the views. The temperature-conditioned mixing tube 38 is supplied with the two-part adhesive components by the directly connected displacement metering package including an air pressurized cylinder 60, and piston 62 connected to plunger-type displacement rods 64 to push-pull them up and down in feed cylinders 65. When piston 62 is retracted upwardly in air pressure cylinder 60, displacement rods 64 are likewise retracted from feed cylinders 65, which can then be filled respectively with a first part of the adhesive and a second part of the adhesive from refill valving 46 (shown in FIG. 4). When adhesive is needed for streaming, piston 68 forces displacement rods 64 down into feed cylinders 65 to force the adhesive components separately from the respective chamber outlets 65*a* at their lower ends through short internal dispense passages 65*b*. Passages 65*b* formed integrally in the metering block are short enough that the material is effectively dispensed immediately into the metering system.

The still-separated components of the adhesive then flow into metering valve chambers 66 where dispense ball valves 66*a* are selectively retracted or forced toward valve seats 66*b* (FIG. 6A) to meter flow through injection passages 68, 70. Dispense ball valves elements 66*a* are operated by dispense valves 66 mounted on the metering block 34, operated by appropriate pressurized fluid (usually air) through couplings 48*a* acting on pistons 48*b* connected to the ball valve 66*a*. The details of the operation and structure of refill valves 46 and dispense valves 48 will be apparent to those skilled in the art, as they are commercially available off-the-shelf items.

As the first and second components of the two part adhesive flow respectively through injection passages 68, 70 they are preferably directly injected from passages 68, 70 into the shortened mixing tube.

Figure 5:
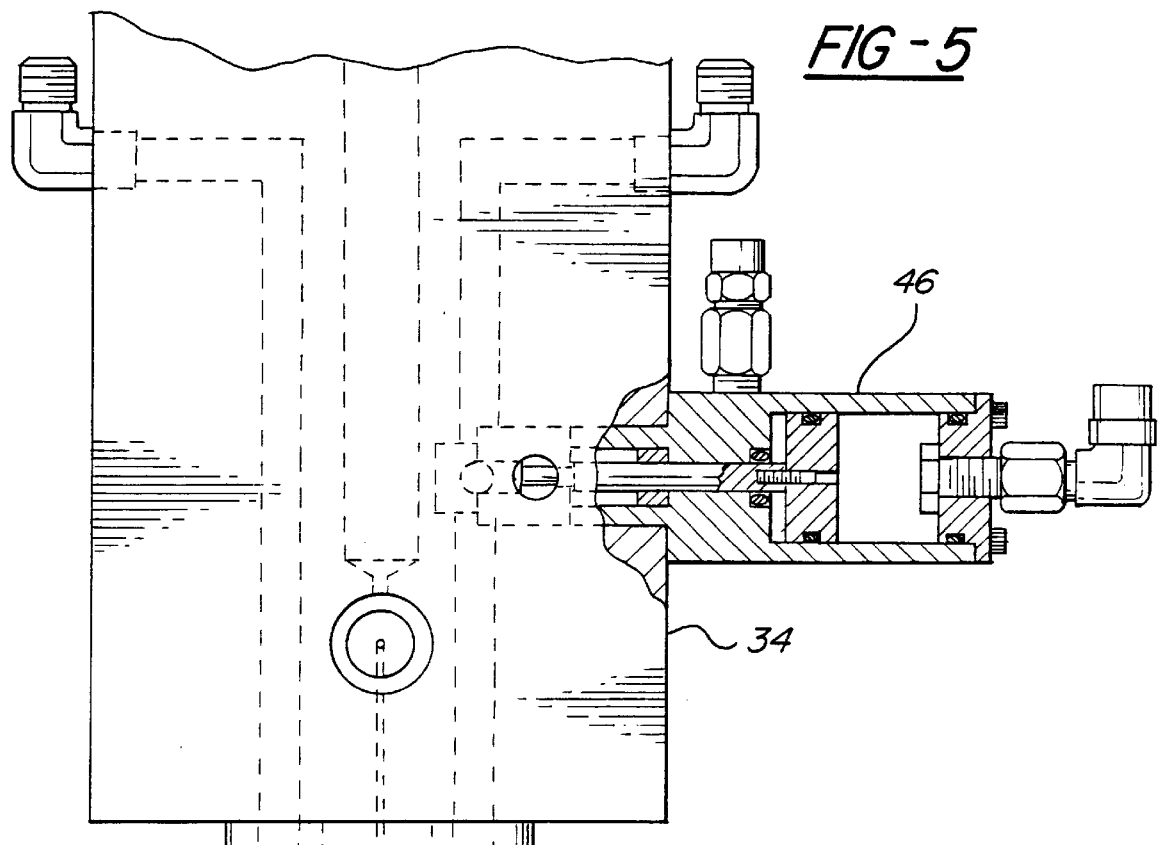
FIG. 5 is a detailed side view of the displacement metering package and mixing tube of FIG. 3, in partial section, illustrating the valving and internal passages.

After leaving injection passages 68, 70 the two components begin to mix as they contact the upper mixing plates of the shortened mixing tube 38. This mixing is enhanced by the temperature conditioning of the tube via heated jacket block 36, which is preferably heated by a through-flow of hot water or other fluid through appropriate conduits or passages formed in block 36. As illustrated in FIG. 5, dispense block 34 is temperature conditioned as well, and can share common heating passages. It will be apparent to those skilled in the art, however, that the means for heating block 36 are not critical, and other methods such as electrical heating are possible.

Accordingly, the viscosity of the already-pressurized first and second components of the adhesive is decreased the further it flows through the mixing tube, enhancing the mixing process such that the material is fully mixed in about half the length of an ordinary mixing tube. For example, the inventors have achieved successful results (one hundred percent mixing) using the device of FIG. 6 with as few as eight stages of mixing plates in tube 38. The normal complement of mixing stages is on the order of twenty-four.

Once fully mixed, the heated, pressurized two-part adhesive is streamed from an orifice 42. Pressure control can be closely regulated by the immediately upstream piston/plunger rods and dispense valves 48. At the same time, temperature control can be quickly adjusted by heating or cooling jacket 36. Point-of-application control and rapid volume adjustment are therefore possible for a two-part mixture in a streaming application.

Other advantages of the temperature-conditioned mixing tube include the ability to use a smaller diameter, lower volume tube, for example 1/7 of the usual volume; shorter mixing stages, for example using four mixing plates per inch instead of two; and the reinforcement provided by the metal temperature conditioning jacket, which (as illustrated) provides a closely conforming bore for the typically thin-walled mixing tube, such that the jacket reinforces the tube to operate at high adhesive pressures. The jacket also protects the mixing tube from damage when the tube hits the workpiece.

Figure 6B:
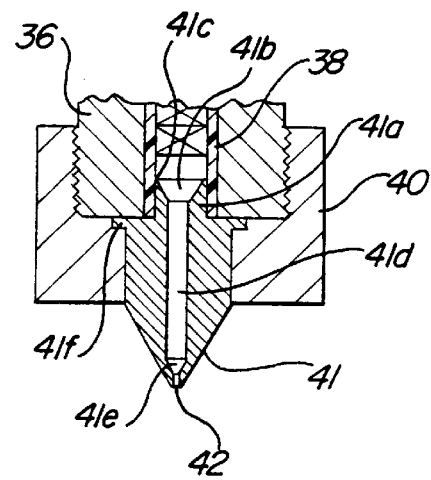
FIG. 6B is a detailed side section view of the streaming orifice insert shown in FIG. 6.

Although the fully mixed two-part adhesive can be streamed from the standard tip of the plastic mixing tube, FIGS. 5, 6 and 6b illustrate a preferred arrangement according to the present invention, wherein the plastic tip of the mixing tube is removed (e.g., cut off) and replaced with a machined metal nozzle 41 for improved streaming. Nozzle 41 is best shown in FIG. 6b, consisting of a single machined piece of aluminum, although other metals can be used. Nozzle 41 includes a friction-fit plug portion 41a which is inserted into and fits closely with the bore of the plastic mixing tube 38, and which includes a chamfered, funnel-like inlet 41b. Plug or boss 41a preferably has a diameter slightly larger than the inner diameter of mixing tube 38, for example 0.002" larger, and an upper edge 41c of preferably minimal thickness, for example a 0.001–0.005" flat 41c to provide a minimum of obstruction to the flow of adhesive while still maintaining enough strength to survive rough handling without damage. This sharp-edged funnel-shape is important, because it has been found that a wide "flat" or shoulder at the upper end of the plug tends to be by-passed by the main adhesive flow after initial wetting, such that the adhesive stuck in a squared-off corner hardens up after a few minutes and impedes flow, eventually growing into a donut-shaped obstruction that can choke it off. In the illustrated embodiment, the angle of the funneled inlet is 60° from horizontal.

The adhesive enters funnel-shaped inlet 41b and proceeds through the hollow bore 41d of the nozzle to an outlet end comprising a second internal funnel-shaped reducing portion 41e converging toward the cylindrical streaming orifice 42, also formed at a 60° angle to avoid the type of clogging problems noted at the inlet end of the nozzle.

In the illustrated embodiment the streaming orifice diameter is on the order of 0.032" inches.

Nozzle 41 is formed with a retaining shoulder 41f at its upper end, the shoulder being engaged by collar nut 40 as illustrated in FIGS. 5 and 6b to retain the nozzle firmly on the tube, and to reinforce the junction of nozzle and tube such that it is capable of withstanding pressures of up to 2000 psi (normal streaming pressures are in the range of 500 to 1000 psi). Additionally, the use of integral steel nozzle 41, collar 40 and temperature-conditioned jacket 36 around the mixing tube provides a stout assembly that can survive a contact with the workpiece or the workpiece-supporting fixture which would damage or destroy prior art arrangements. Assembly of nozzle 41, mixing tube 38, jacket 36 and collar 40 is simple: the mixing tube with its cutoff lower end is simply dropped into the mating bore in jacket 36; the jacket with inserted tube is connected to the metering block 34 in a bayonet fit; the machined nozzle is inserted into the outlet of the mixing tube, whose cutoff end is preferably flush with the bottom of heating jacket 36, in a tight interference fit; and collar 40 is threaded onto the threaded end of the jacket and tightened. Replacement of nozzle 41 in the event of damage is simple: remove collar 40, replace the nozzle, and replace the collar.

It will be understood by those skilled in the art that the foregoing description of an illustrated embodiment of the invention is subject to modification and substitution of reasonable equivalents in terms of mechanical details. The invention is accordingly not limited to the illustrated embodiment except as set forth in the following claims.

We claim:

1. An apparatus for streaming a high viscosity, two-part adhesive having first and second components which require mixing prior to being applied to a workpiece, comprising:

a unitary dispense package operatively located as a tool-mounted end effector within adhesive-applying distance of a workpiece for application of the two-part adhesive to the workpiece during relative movement between the workpiece and the end effector, the dispense package comprising adhesive flow control means, adhesive metering means, and a temperature-conditioned mixing tube for receiving the first and second components from the flow control means via the metering means to mix the first and second components as they proceed toward a streaming orifice means and to temperature condition the first and second components in the temperature-conditioned mixing tube.

2. The apparatus of claim 1, wherein the flow control means comprises displacement rods operatively located to displace the first and second components separately to the metering means.

3. The apparatus of claim 1, wherein the flow control means includes an outlet for each of the first and second components, and the metering means comprises dispense valving immediately associated with each outlet to precisely control the flow of the first and second components from the flow control means to the temperature-conditioned mixing tube.

4. The apparatus of claim 3, wherein the temperature-conditioned mixing tube comprises a mixing tube removably contained within a temperature-conditioning jacket attached to a metering block containing the dispense valving.

5. The apparatus of claim 4, wherein the temperature-conditioning jacket includes one or more passages for receiving a temperature-conditioned fluid.

6. The apparatus of claim 4, wherein the streaming orifice means comprises a nozzle removably attached to an outlet end of the mixing tube.

7. The apparatus of claim 6, wherein the nozzle includes a nozzle inlet end having a plug portion adapted to be inserted into the outlet end of the mixing tube.

8. The apparatus of claim 7, wherein the nozzle inlet end includes a shoulder portion adapted to be held in place against the heating jacket by a removable collar.

9. The apparatus of claim 7, wherein the inlet end of the nozzle includes a funnel-shaped inlet narrowing to a throughbore, the nozzle further having a nozzle outlet end with a streaming orifice having a diameter less than the diameter of the throughbore, and a funnel-shaped reducing portion connecting the throughbore to the streaming orifice.

10. The apparatus of claim 4, wherein the temperature-conditioning jacket comprises a metal body having a tube-receiving bore adapted to receive the mixing tube in a closely conforming fit such that the wall of the mixing tube is reinforced by the metal body.

11. The apparatus of claim 1, wherein the dispense package comprises an end effector mounted on a robot arm.

12. Apparatus for streaming a high viscosity, two-part adhesive having first and second components which require mixing prior to being applied to a workpiece, comprising:
   serially connected flow control, dispense metering, and temperature-conditioned mixing tube means combined as a unitary end effector dispense package on a robot arm adapted to place the entire dispense package at a dispense point within adhesive-applying distance of a workpiece during relative movement between the workpiece and robot arm.

13. An apparatus for streaming a high viscosity, two-part adhesive having first and second components which require mixing prior to being applied to a workpiece, comprising:
   a unitary dispense package adapted to be mounted on a tool as an adhesive-applying end effector, the dispense package having refill means for receiving the first and second components of the two-part adhesive from an offboard supply, a flow control portion with displacement rods operated to displace the first and second components from corresponding displacement rod chambers, the displacement rod chambers opening directly to metering valve means which control flow of the first and second components from the displacement rod chambers through injection passages, and a temperature-conditioned mixing tube connected to the dispense package to receive the first and second components from the injection passages in an unmixed state and to mix and temperature condition the first and second components prior to their being dispensed from a streaming orifice at a downstream end of the temperature-conditioned mixing tube.

14. The apparatus of claim 11, wherein the displacement rod chambers and the metering valve means are contained in a temperature-conditioned metering block connected to the flow control portion, and the temperature-conditioned mixing tube is contained in a temperature-conditioned jacket attached to the metering block.

15. The apparatus of claim 14, wherein the temperature-conditioned metering block and the temperature-conditioned jacket are heated by a common fluid-conducting passage.

16. The apparatus of claim 14, wherein the temperature-conditioned metering block includes integral dispense passages between the displacement rod chambers and the metering valve means.

17. The apparatus of claim 14, wherein the temperature-conditioned mixing tube comprises a temperature-conditioned jacket with a tube-receiving bore for removably receiving the temperature-conditioned mixing tube in a close conforming fit, a removable nozzle in direct fluid connection with an outlet end of the temperature-conditioned mixing tube when the temperature-conditioned mixing tube is in the tube-receiving bore in the temperature-conditioned jacket, and means for retaining the nozzle in fluid connection with the outlet end of the temperature-conditioned mixing tube.

18. The apparatus of claim 13, wherein the dispense package comprises an end effector mounted on a robot arm.

19. An apparatus for streaming a high viscosity, two-part adhesive having first and second components which require mixing prior to being applied to a workpiece, comprising:
   a dispense package capable of being applied as a tool-mounted end effector to a workpiece and adapted to apply two-part adhesive to the workpiece during relative movement between the workpiece and the end effector, the dispense package comprising adhesive flow control means and a mixing device terminating in a streaming orifice, the flow control means adapted to supply the first and second components of the two-part adhesive from a supply source to the mixing device at a desired flow rate, the dispense package further defining a constant temperature flow path for the two-part adhesive from the flow control means to the streaming orifice such that the adhesive remains at substantially the same temperature from the flow control means to the streaming orifice.

20. An apparatus for streaming a high viscosity, two-part adhesive having first and second components which require mixing prior to being applied to a workpiece, comprising:
   a mixing tube adapted to receive the first and second components and to mix them along its length and deliver them in a fully mixed state to a streaming orifice, and a temperature-conditioning device associated with the mixing tube to temperature-condition the adhesive components as they are being mixed in the tube along substantially the entire length of the tube to the streaming orifice.

21. The apparatus of claim 20, wherein the temperature-conditioning device comprises a temperature conditioning jacket surrounding the mixing tube.

22. The apparatus of claim 21, wherein the streaming orifice is defined by a nozzle removably connected to the temperature-conditioning jacket.

23. The apparatus of claim 22, wherein the nozzle includes a plug portion adapted to be inserted into an outlet end of the mixing tube in the heating jacket.

24. The apparatus of claim 23, wherein the plug portion has a funnel-like inlet converging to a cylindrical bore, and the nozzle further includes a streaming orifice connected to the cylindrical bore by a funnel-like reducing portion converging toward the streaming orifice.

25. The apparatus of claim 23, wherein the mixing tube comprises plastic, and the nozzle comprises metal.

26. Apparatus for streaming a high viscosity, two-part adhesive having first and second components which require mixing prior to being applied to a workpiece, comprising:
   a mixing tube adapted to receive the first and second components of the two-part adhesive at a first end and progressively mix the components as they travel from the first end to a second end comprising a streaming orifice, wherein the mixing tube is temperature-conditioned along substantially its entire length from the first end to the second end to maintain the adhesive components at a desired temperature.

27. The apparatus of claim 26, further comprising a separate, removable nozzle attached to the mixing tube to define the streaming orifice.

28. The apparatus of claim 27, wherein the mixing tube has a constant diameter bore from the first end to the second end, and the nozzle defines a converging bore from the second end of the mixing tube to the streaming orifice.

29. The apparatus of claim 28, wherein the mixing tube is made from plastic and the nozzle is made from metal.

30. An apparatus for streaming a high viscosity, two-part adhesive having first and second components which require mixing prior to being applied to a workpiece, comprising:

a mixing tube having a first end for receiving the first and second components of the two-part adhesive in a substantially unmixed state, means for mixing the components as they travel from the first end to a second end of the mixing tube, and a separate, removable streaming orifice nozzle mounted on the second end for receiving the mixed components and streaming them from the second end of the mixing tube.

31. An apparatus for streaming a high viscosity, two-part adhesive having first and second components which require mixing prior to being applied to a workpiece, comprising:

a dispense package mounted on a tool as an end effector to be operatively located at a dispense point within adhesive-applying distance of a workpiece and adapted to apply two-part adhesive to the workpiece during relative movement between the workpiece and the dispense package, the dispense package comprising a metering block and a nozzle body connected to the metering block, the metering block being adapted to receive the first and second components of the two-part adhesive and supply them at a desired flow rate to the nozzle body, the nozzle body including a mixing tube, a temperature-conditioned jacket surrounding the mixing tube, and a streaming orifice at a dispense end of the mixing tube, wherein the metering block and the nozzle body are temperature-conditioned to define a constant temperature flow path for the first and second components to the streaming orifice.

32. A method for applying a high viscosity, two-part adhesive having first and second components which require mixing prior to being applied to a workpiece, comprising the steps of:

injecting the first and second components of the two-part adhesive into a mixing tube at a desired flow rate;

temperature conditioning the first and second components as they are mixed in the mixing tube to a point of dispensing, such that the first and second components become a temperature-conditioned two-part adhesive by the time they reach the point of dispensing; and dispensing the temperature-conditioned two-part adhesive directly from the mixing tube through a streaming orifice at the dispensing point to a workpiece at a flow rate and distance from the workpiece such that the two-part material is streamed onto the workpiece.

33. An apparatus for streaming a high viscosity, two-part adhesive having first and second components which require mixing prior to being applied to a workpiece, comprising:

an end effector dispense package mounted on a robot arm, the dispense package comprising serially connected flow control means, metering means, and a temperature-conditioned mixing tube for receiving the first and second components from the flow control means via the metering means to mix the first and second components as they proceed toward a streaming orifice means and to temperature-condition the first and second components in the temperature-conditioned mixing tube, the flow control means including an outlet for each of the first and second components, and the metering means comprising dispense valving immediately associated with each outlet to precisely control the flow of the first and second components from the flow control means to the temperature-conditioned mixing tube, wherein the temperature-conditioned mixing tube comprises a shortened mixing tube contained within a temperature-conditioning jacket.

34. The apparatus of claim 33, wherein the temperature-conditioning jacket includes one or more passages for receiving a temperature-conditioned fluid.

35. The apparatus of claim 33, wherein the streaming orifice means comprises a nozzle removably attached to an outlet end of the mixing tube.

36. The apparatus of claim 35, wherein the nozzle includes a nozzle inlet and having a plug portion adapted to be inserted into the outlet end of the mixing tube.

37. The apparatus of claim 36, wherein the nozzle inlet end includes a shoulder portion adapted to be held in place against the heating jacket by a removable collar.

38. The apparatus of claim 33, wherein a temperature-conditioning jacket comprises a metal body having a tube-receiving bore adapted to receive the mixing tube in a closely conforming fit such that the wall of the mixing tube is reinforced by the metal body.

39. An apparatus for streaming a high viscosity, two-part adhesive having first and second components to require mixing prior to being applied to a workpiece, comprising:

an end effector dispense package mounted on a robot arm, the dispense package having refill means for receiving the first and second components of the two-part adhesive from an offboard supply, a flow control portion with displacement rods operated to displace the first and second components from corresponding displacement rod chambers, the displacement rod chambers opening directly to metering valve means which control flow of the first and second components from the displacement rod chambers through injection passages, and a temperature-conditioned mixing tube connected to the dispense package to receive the first and second components from the injection passages in an unmixed state and to mix and temperature-condition the first and second components prior to their being dispensed from a streaming orifice at a downstream end of the temperature-conditioned mixing tube, wherein the displacement rod chambers and the metering valve means is contained in a temperature-conditioned metering block connected to the flow control portion, and the temperature-conditioned mixing tube is contained in a temperature-conditioned jacket attached to the metering block.

40. The apparatus of claim 39, wherein the temperature-conditioned metering block and the temperature-conditioned jacket are heated by a common fluid-conducting passage.

41. The apparatus of claim 39, wherein the temperature-conditioned metering block includes integral dispense passages between the displacement rod chambers and the metering valve means.

42. The apparatus of claim 39, wherein the temperature-conditioned mixing tube comprises a temperature-conditioned jacket with a tube-receiving bore for removably receiving the temperature-conditioned mixing tube in a close conforming fit, a removable nozzle in direct fluid connection with an outlet end of the temperature-conditioned mixing tube when the temperature-conditioned mixing tube is in the tube-receiving bore in the temperature-conditioned jacket, and means for retaining the nozzle and fluid connection with the outlet end of the temperature-conditioning mixing tube.

* * * * *